(12) United States Patent
Menditto et al.

(10) Patent No.: US 8,923,275 B2
(45) Date of Patent: Dec. 30, 2014

(54) PROVIDING SERVICE INFORMATION FOR CHARGING A SUBSCRIBER FOR A SERVICE

(75) Inventors: Louis F. Menditto, Raleigh, NC (US); Steven R. Donovan, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 2072 days.

(21) Appl. No.: 11/742,623

(22) Filed: May 1, 2007

(65) Prior Publication Data

US 2008/0273523 A1 Nov. 6, 2008

(51) Int. Cl.
*H04L 12/66* (2006.01)
*H04L 12/14* (2006.01)
*H04M 15/00* (2006.01)
*H04L 29/06* (2006.01)

(52) U.S. Cl.
CPC ............ *H04L 12/14* (2013.01); *H04L 12/1453* (2013.01); *H04M 2215/22* (2013.01); *H04M 15/8292* (2013.01); *H04M 15/8228* (2013.01); *H04M 2215/7833* (2013.01); *H04M 15/63* (2013.01); *H04L 65/1006* (2013.01)
USPC ......................................... 370/352

(58) Field of Classification Search
USPC .................................. 370/352–356
See application file for complete search history.

(56) References Cited

U.S. PATENT DOCUMENTS

| 6,073,175 | A | 6/2000 | Tavs et al. ...................... 709/226 |
| 6,614,792 | B1 | 9/2003 | Pazy et al. ................. 370/395.53 |
| 6,775,267 | B1* | 8/2004 | Kung et al. ..................... 370/352 |
| 7,016,973 | B1 | 3/2006 | Sibal et al. ..................... 709/238 |
| 7,107,039 | B2 | 9/2006 | Liao et al. ...................... 455/406 |
| 7,209,473 | B1* | 4/2007 | Mohaban et al. ............. 370/352 |
| 7,496,670 | B1* | 2/2009 | Givoly ........................... 709/230 |
| 2005/0014483 | A1* | 1/2005 | Lagerstrom ................... 455/405 |
| 2005/0026558 | A1* | 2/2005 | Stura et al. .................... 455/3.06 |
| 2005/0044360 | A1* | 2/2005 | Wengrovitz .................. 713/165 |
| 2006/0004643 | A1* | 1/2006 | Stadelmann et al. ........... 705/34 |
| 2006/0050711 | A1* | 3/2006 | Lialiamou et al. ......... 370/395.2 |
| 2006/0165068 | A1* | 7/2006 | Dalton et al. .................. 370/352 |
| 2006/0291486 | A1* | 12/2006 | Cai et al. ....................... 370/401 |

* cited by examiner

*Primary Examiner* — Nicholas Jensen
(74) *Attorney, Agent, or Firm* — Baker Botts L.L.P.

(57) ABSTRACT

Providing service information includes receiving session initiation protocol (SIP) packets from a SIP proxy. Service information is extracted from the SIP packets. The service information describes a service provided to an access terminal associated with a subscriber. The service information is sent to a charging/enforcement point operable to charge the subscriber for the service.

17 Claims, 1 Drawing Sheet

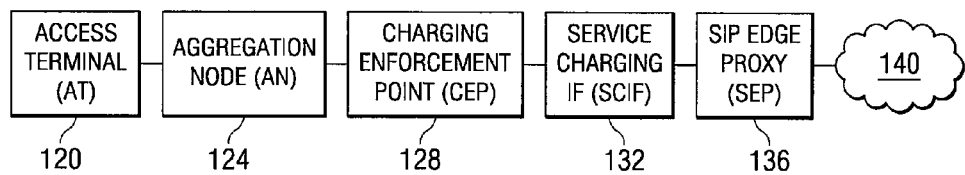
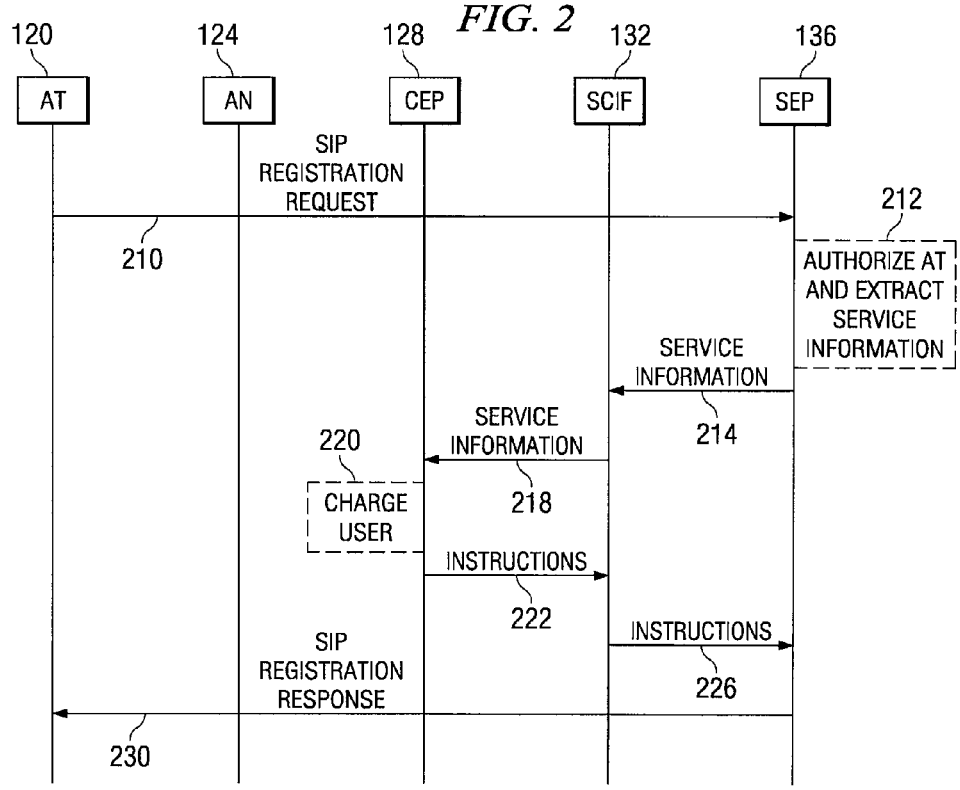

PROVIDING SERVICE INFORMATION FOR CHARGING A SUBSCRIBER FOR A SERVICE

TECHNICAL FIELD

This invention relates generally to the field of telecommunications and more specifically to providing service information for charging a subscriber for a service.

BACKGROUND

A communication network system may provide services to an access terminal of a subscriber. Examples of services include electronic mail (email), audio, video, multimedia, instant messaging, web browsing, and/or other services.

The subscriber may be charged for a service. Information about the subscriber's usage of the service may be collected in order to charge the subscriber. Known techniques for collecting the information, however, may not be efficient in certain situations.

SUMMARY OF THE DISCLOSURE

In accordance with the present invention, disadvantages and problems associated with previous techniques for providing service information may be reduced or eliminated.

According to one embodiment of the present invention, providing service information includes receiving session initiation protocol (SIP) packets from a SIP proxy. Service information is extracted from the SIP packets. The service information describes a service provided to an access terminal associated with a subscriber. The service information is sent to a charging/enforcement point operable to charge the subscriber for the service.

Certain embodiments of the invention may provide one or more technical advantages. A technical advantage of one embodiment may be that a service charging interface may communicate service information from a Session Initiation Protocol (SIP) edge proxy to a charging/enforcement point. The SIP edge proxy may extract from SIP packets service information describing a service provided to a subscriber. The charging/enforcement point may use the service information to charge the subscriber for the service. The service charging interface may allow the charging/enforcement point to obtain information that the SIP edge proxy can extract, but that the charging/enforcement point cannot extract.

Another technical advantage of one embodiment may be that the service charging interface may communicate instructions from charging/enforcement point to the Session Initiation Protocol (SIP) edge proxy. The service charging interface may allow for the charging/enforcement point to instruct SIP edge proxy to perform SIP operations.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 illustrates one embodiment of a system that provides services to an access terminal; and FIG. 2 illustrates one embodiment of a method for providing service information for charging a subscriber for a service that may be used by the system of FIG. 1.

DETAILED DESCRIPTION OF THE DRAWINGS

Embodiments of the present invention and its advantages are best understood by referring to FIGS. 1 and 2 of the drawings, like numerals being used for like and corresponding parts of the various drawings.

FIG. 1 illustrates one embodiment of a communication network system 10 that provides services to an access terminal 120. According to the embodiment, a service charging interface 132 may communicate service information from a Session Initiation Protocol (SIP) edge proxy 136 to a charging/enforcement point 128. SIP edge proxy 136 may extract from SIP packets service information describing a service provided to a subscriber. Charging/enforcement point 128 may use the service information to charge the subscriber for the service. Service charging interface 132 may allow for charging/enforcement point 128 to obtain information that SIP edge proxy 136 can extract, but that charging/enforcement point 128 cannot extract.

According to the illustrated embodiment, system 10 communicates information. Information may refer to voice, data, text, audio, video, multimedia, control, signaling, other information, or any combination of any of the preceding. Information may be communicated in packets. A packet may comprise a bundle of data organized in a specific way for transmission.

System 10 provides services to endpoints such as access terminal 120. Examples of services include electronic mail (email), audio, video, multimedia, instant messaging, web browsing, presence, and/or other services. The subscriber may be charged for the service. The charges may be deducted from a prepaid account, or the subscriber may be billed for the charges.

System 10 may utilize communication protocols and technologies to provide the services. Examples of communication protocols and technologies include those set by the Institute of Electrical and Electronics Engineers, Inc. (IEEE) 822.xx standards, the International Telecommunications Union (ITU-T) standards, the European Telecommunications Standards Institute (ETSI) standards (for example, General Packet Radio Services (GPRS)), the Internet Engineering Task Force (IETF) standards, or other standards.

According to the illustrated embodiment, system 10 includes access terminal (AT) 120, aggregation nodes (ANs) 124, charging/enforcement point (CEP) 128, service charging interface (SCIF) 132, SIP edge proxy (SEP) 138, and an IP network 140.

Access terminal 120 represents any suitable device operable to communicate with a communication network. Access terminal 120 may comprise, for example, a personal digital assistant, a computer such as a laptop, a cellular telephone, a mobile handset, or any other device operable to communicate with system 10. Access terminal 120 may support any suitable protocol, for example, IP and/or mobile IP.

Aggregation node 124 aggregates packet flows from different access nodes. Different flows may be associated with the same service. For example, control and streaming flows may be associated with the same video call. The flows are typically associated with each other in order to appropriately charge the subscriber. Aggregation node 124 may comprise a general packet radio service (GPRS) node such as a gateway GPRS support node (GGSN) or a packet data serving node (PDSN).

Charging/enforcement point 128 controls a subscriber's access to a service, charges the subscriber for the service, and/or notifies the subscriber of access or denial of a service. Charging/enforcement point 128 may be located in any suitable network element, for example, an access gateway.

The subscriber may be charged for a service in any suitable manner. In one embodiment, the charging may be time-based or event-based. Time-based charging charges the subscriber according to the amount of time the subscriber uses the service, for example, the amount of time a subscriber is on an audio call. Event-based charging charges the subscriber according to the number of times the subscriber uses the service, for example, the number of times the subscriber sends a text message.

Different types of chargeable services may be charged differently. As a first example, charging for an audio call may be time-based. The audio call may be free for an initial period of time, and then charges may be applied for additional time. Control traffic may not be charged until a call reaches a certain stage. As a second example, charging for a video call may be time-based. Since video calls require a higher bandwidth reservation, there may not be a free initial period of time.

As a third example, charging for messaging may be event-based. For example, a user may be charged per message for messages of a certain message size. Larger messages may accrue an additional charge or may be blocked. As a fourth example, presence messages may be free.

Charging/enforcement point 128 may maintain call data records (CDRs) that include information about a call used to create a billing record. A CDR may include, for example, the called and calling parties, originating switch, terminating switch, call length, time of day, and/or other information that may be used to create billing records.

SIP edge proxy 136 operates as a SIP proxy and performs SIP operations such as routing requests, authenticating and authorizing access terminal 120, implementing routing policies, and providing features.

SIP edge proxy 136 may parse, decrypt, and/or decompress SIP messages to extract service information describing a service provided to access terminal 120. Service information may be used to charge a subscriber for a service. For example, service information may describe the type of service, such as an electronic mail (email), audio, video, multimedia, instant messaging, web browsing, presence, and/or other service. Service information may describe usage of the service, such as the duration of the service or the number of events of a service. For example, a bye signal may be used to verify that an underlying stream has stopped.

Service information may describe other factors that affect charging. For example, service information may indicate whether access terminal 120 is roaming, whether there is a call failure, whether the requested quality of service matches the delivered quality of service, and/or other factors.

Service charging interface 132 communicates information between SIP edge proxy 136 and charging/enforcement point 128, and may use a Diameter interface to send the information. Service charging interface 132 may be independent of or incorporated with SIP edge proxy 136.

According to one embodiment, service charging interface 132 may receive service information from SIP edge proxy 136 and provide the information to charging/enforcement point 128. Charging/enforcement point 128 may use the service information to charge the user for services. Service charging interface 132 may also send instructions from charging/enforcement point 128 to SIP edge proxy 136.

Service charging interface 132 may send information at particular trigger points. In one example, a trigger point may occur when a caller sends a SIP registration request to request a SIP service. In another example, a trigger point may occur when a caller sends an invite request to a callee. In another example, a trigger point may occur when a callee sends an okay response.

IP network 140 represents a communication network. In general, a communication network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

A component of system 10 may include any suitable arrangement of elements, for example, an interface, logic, memory, other suitable element, or combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Furthermore, some elements of system 10 may be moved from home to visited network or from visited to home network. As used in this document, "each" refers to each member of a set or each member of a subset of a set.

FIG. 2 illustrates one embodiment of a method for providing service information for charging a subscriber for a service that may be used by the system of FIG. 1.

The method begins at step 210, where access terminal 120 sends a SIP registration request to SIP edge proxy 136. The SIP registration request may be used to register access terminal 120 for a SIP service. SIP edge proxy 136 authorizes access terminal 120 for use of the service and extracts service information from registration request at step 212. The service information may be used to charge the user for use of the SIP service.

SIP edge proxy 136 sends the service information to service charging interface 132 at step 214. Service charging interface 132 sends the service information to charging/enforcement point 128 at step 218. Charging/enforcement point 128 uses the service information to charge the user for the service at step 220.

Charging/enforcement point 128 may send instructions to service charging interface 132 at step 222. The instructions may be used to examine additional SIP packets. Service charging interface 132 forwards the instructions to SIP edge proxy 136 at step 226. SIP edge proxy 136 sends a SIP registration response to access terminal 120 at step 230.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a service charging interface may communicate service information from a Session Initiation Protocol (SIP) edge proxy to a charging/enforcement point. The SIP edge proxy may extract from SIP packets service information describing a service provided to a subscriber. The charging/enforcement point may use the service information to charge the subscriber for the service. The service charging interface may allow the charging/enforcement point to obtain information that the SIP edge proxy can extract, but the charging/enforcement point cannot extract.

Another technical advantage of one embodiment may be that the service charging interface may communicate instructions from charging/enforcement point to the Session Initiation Protocol (SIP) edge proxy. The service charging interface may allow for the charging/enforcement point to instruct SIP edge proxy to perform SIP operations.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for providing service information, comprising:
   receiving a plurality of encrypted session initiation protocol (SIP) packets at a SIP edge proxy server;
   decrypting the SIP packets at the SIP edge proxy server;
   extracting service information from the SIP packets at the SIP edge proxy server, the service information describing a service provided to an access terminal associated with a subscriber;
   sending the extracted service information to an access gateway from the SIP edge proxy server via a service charging interface functionally between the SIP edge proxy server and the access gateway, the access gateway unable to decrypt the encrypted SIP packets, the service charging interface operable to communicate information between the access gateway and the SIP edge proxy server, the access gateway operable to charge the subscriber for the service; and
   receiving instructions at the SIP edge proxy server from the access gateway via the service charging interface functionality to execute SIP operations at the SIP edge proxy server in response to sending the extracted service information to the access gateway.

2. The method of claim 1, wherein extracting the service information from the SIP packets further comprises:
   determining a type of service provided to the access terminal based on the extracted service information.

3. The method of claim 1, wherein extracting the service information from the SIP packets further comprises:
   decompressing the SIP packets to extract the service information.

4. The method of claim 1, wherein the service information identifies the service provided to the access terminal.

5. The method of claim 1, wherein the service information describes usage of the service provided to the access terminal.

6. The method of claim 1, further comprising, receiving an instruction at the SIP proxy via the service charging interface from the charging/enforcement point, the instruction requesting that the SIP proxy server perform one or more SIP operations.

7. The method of claim 1, wherein the service charging interface is separate from the SIP proxy server.

8. An apparatus for providing service information, comprising:
   a memory operable to store service information describing a service provided to an access terminal associated with a subscriber; and
   one or more processors coupled to the memory and operable to:
      receive a plurality of encrypted session initiation protocol (SIP) packets at a SIP edge proxy server;
      decrypt the SIP packets at the SIP edge proxy server;
      extract service information from the SIP packets at the SIP edge proxy server, the service information describing a service provided to an access terminal associated with a subscriber;
      send the extracted service information to an access gateway from the SIP edge proxy server via a service charging interface functionally between the SIP edge proxy server and the access gateway, the access gateway unable to decrypt the encrypted SIP packets, the service charging interface operable to communicate information between the access gateway and the SIP edge proxy server, the access gateway operable to charge the subscriber for the service; and
      receive instructions at the SIP edge proxy server from the access gateway via the service charging interface functionality to execute SIP operations at the SIP edge proxy server in response to sending the extracted service information to the access gateway.

9. The apparatus of claim 8, wherein the one or more processors operable to extract the service information from the SIP packets are further operable to:
   determine a type of service provided to the access terminal based on the extracted service information.

10. The apparatus of claim 8, wherein the one or more processors operable to extract the service information from the SIP packets are further operable to:
    decompress the SIP packets to extract the service information.

11. The apparatus of claim 8, wherein the service information identifies the service provided to the access terminal.

12. The apparatus of claim 8, wherein the service information describes usage of the service provided to the access terminal.

13. A non-transitory computer-readable storage medium comprising logic for providing service information, the logic operable to:
    receive a plurality of encrypted session initiation protocol (SIP) packets at a SIP edge proxy server;
    decrypt the SIP packets at the SIP edge proxy server;
    extract service information from the SIP packets at the SIP edge proxy server, the service information describing a service provided to an access terminal associated with a subscriber;
    send the extracted service information to an access gateway from the SIP edge proxy server via a service charging interface functionally between the SIP edge proxy server and the access gateway, the access gateway unable to decrypt the encrypted SIP packets, the service charging interface operable to communicate information between the access gateway and the SIP edge proxy server, the access gateway operable to charge the subscriber for the service; and receive instructions at the SIP edge proxy server from the access gateway via the service charging interface functionality to execute SIP operations at the SIP edge proxy server in response to sending the extracted service information to the access gateway.

14. The non-transitory computer-readable storage medium of claim 13, wherein the logic is further operable to:
determine a type of service provided to the access terminal based on the extracted service information.

15. The non-transitory computer-readable storage medium of claim 13, wherein the logic is further operable to:
decompress the SIP packets to extract the service information.

16. The non-transitory computer-readable storage medium of claim 13, wherein the service information identifies the service provided to the access terminal.

17. The non-transitory computer-readable storage medium of claim 13, wherein the service information describes usage of the service provided to the access terminal.

* * * * *